Figure 1:
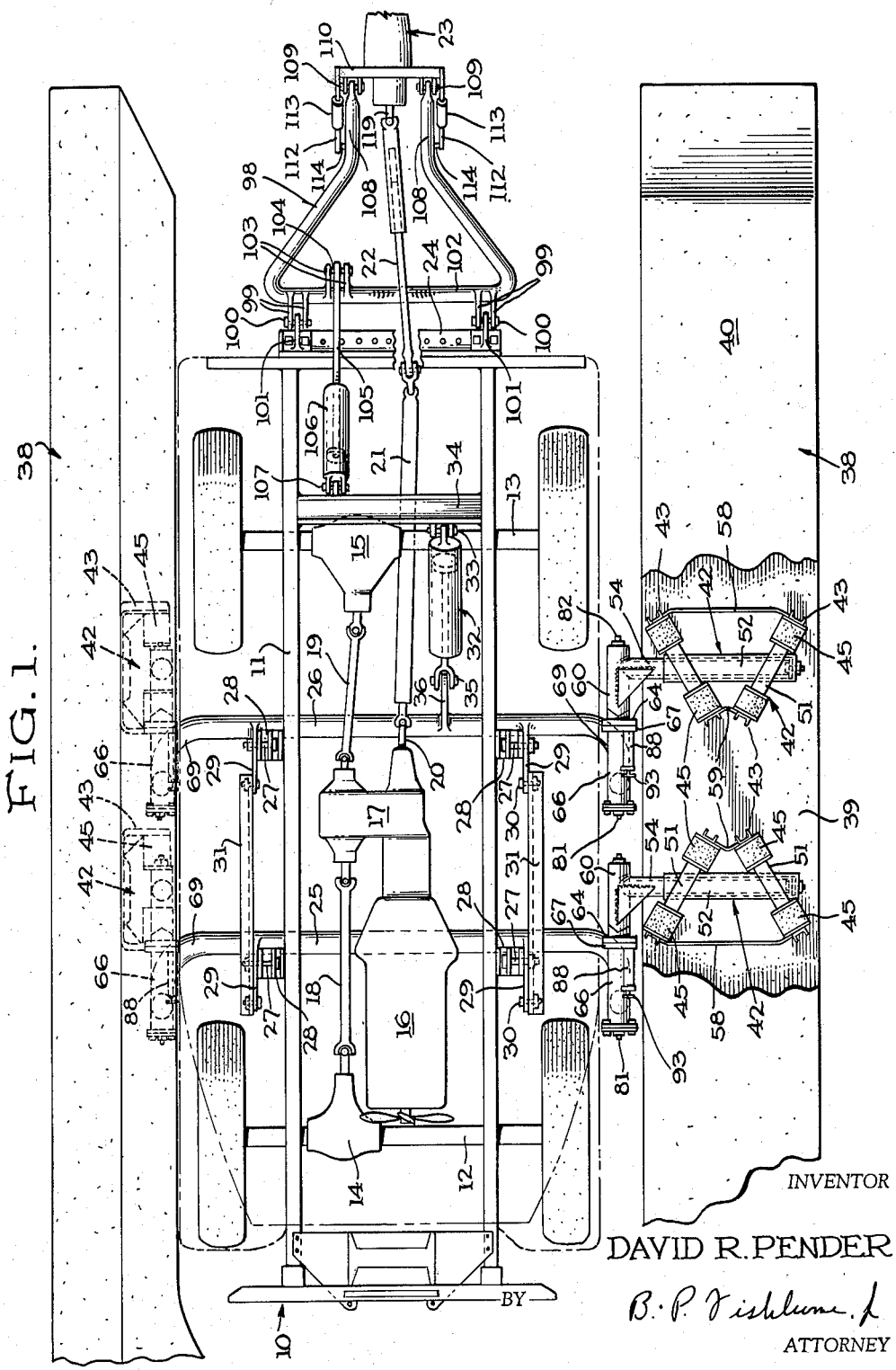

Oct. 20, 1964  D. R. PENDER  3,153,396
AMPHIBIAN VEHICLE
Filed Dec. 11, 1962  5 Sheets-Sheet 1

INVENTOR
DAVID R. PENDER
BY
ATTORNEY

Oct. 20, 1964  D. R. PENDER  3,153,396
AMPHIBIAN VEHICLE
Filed Dec. 11, 1962  5 Sheets-Sheet 2
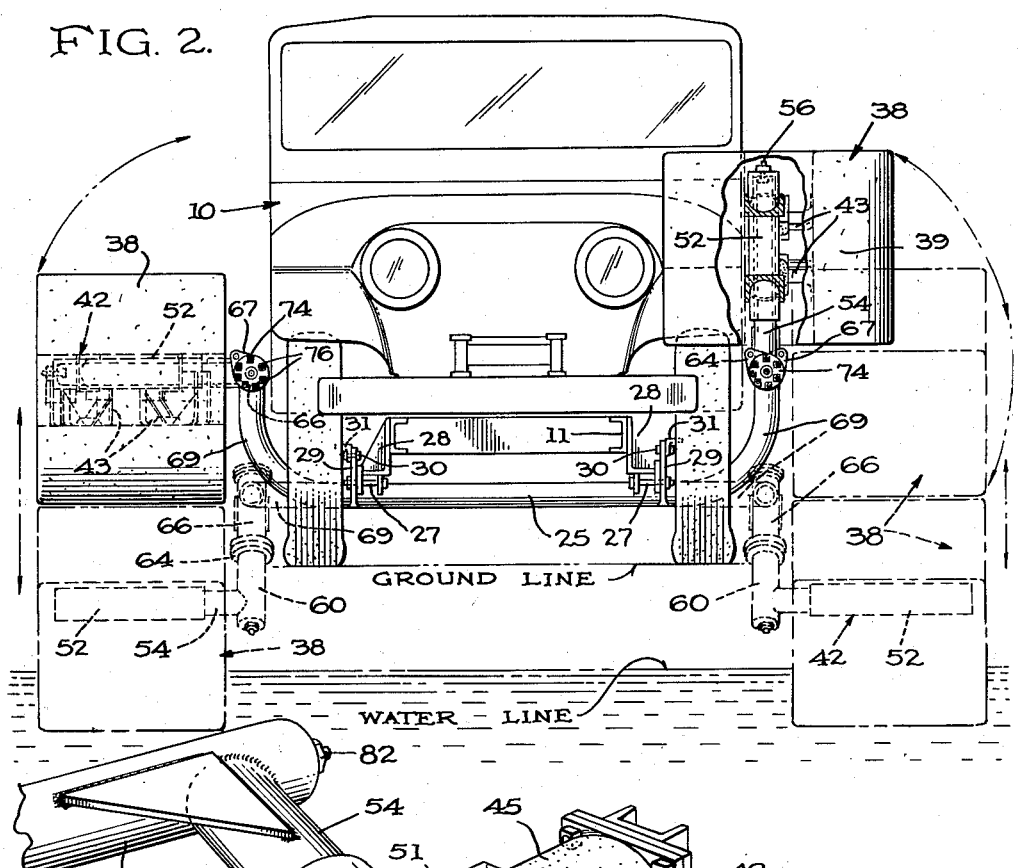
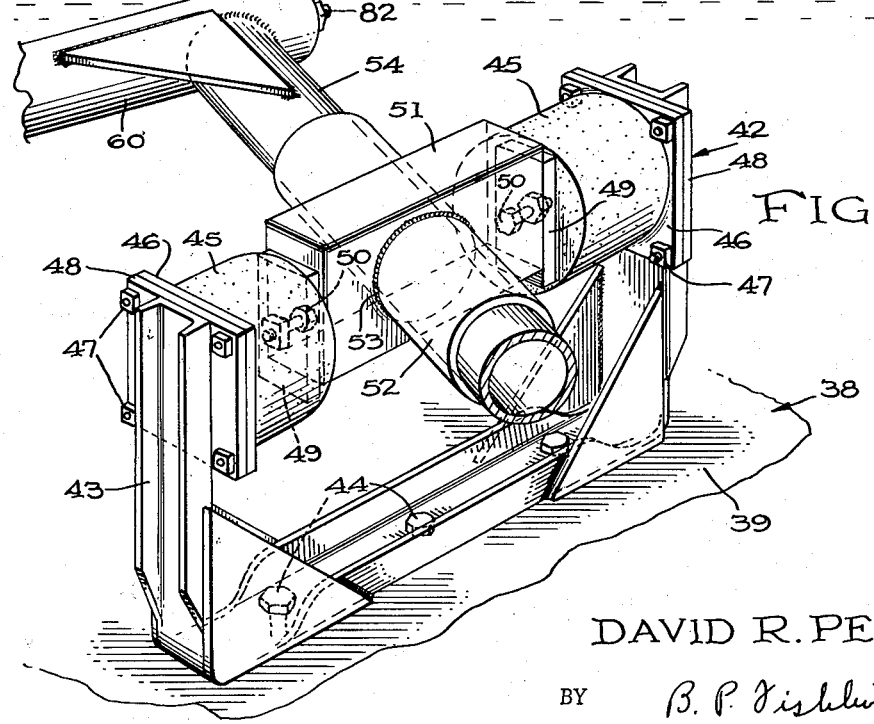
INVENTOR
DAVID R. PENDER
BY
ATTORNEY

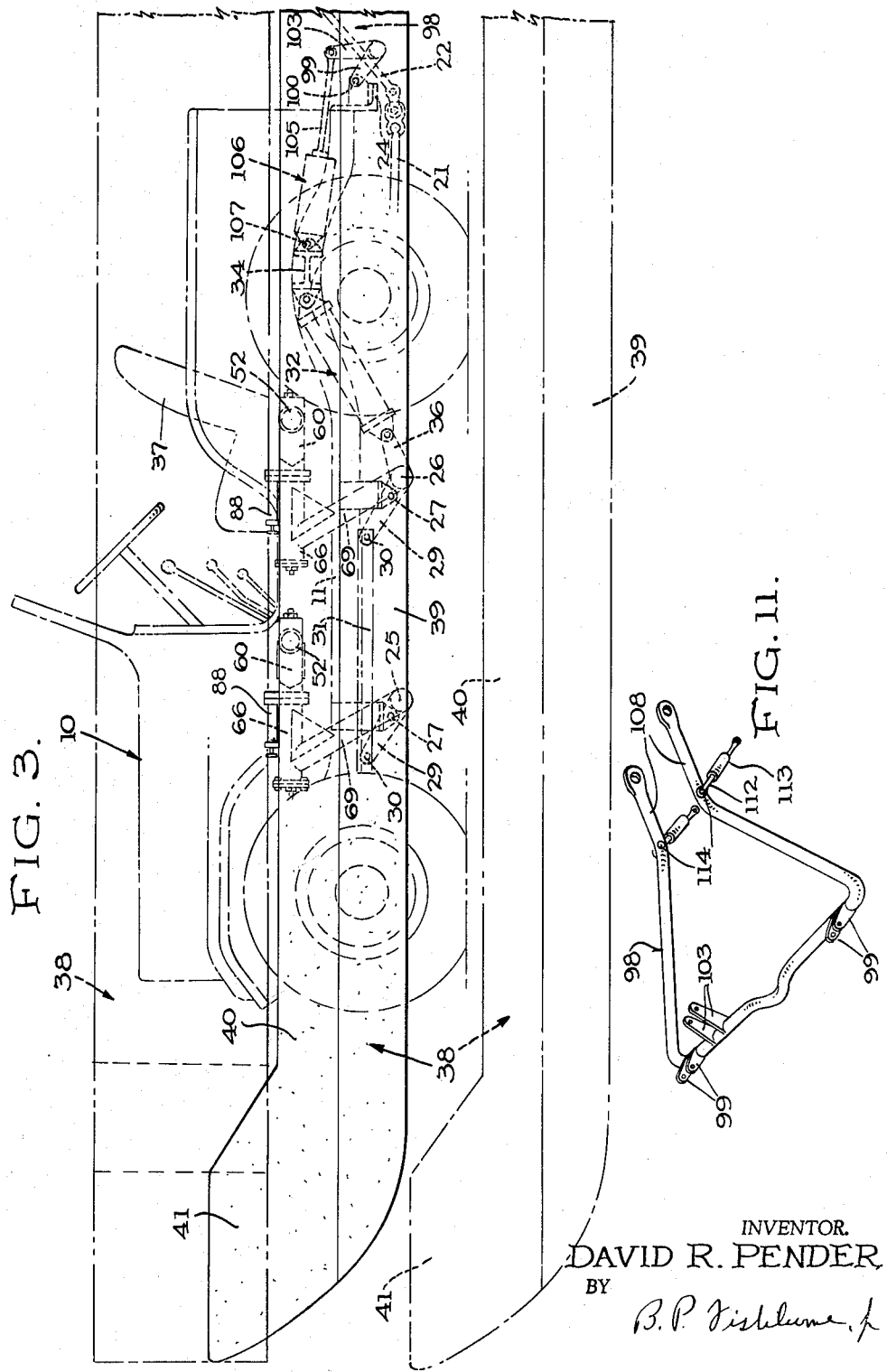

Oct. 20, 1964   D. R. PENDER   3,153,396
AMPHIBIAN VEHICLE
Filed Dec. 11, 1962   5 Sheets-Sheet 4
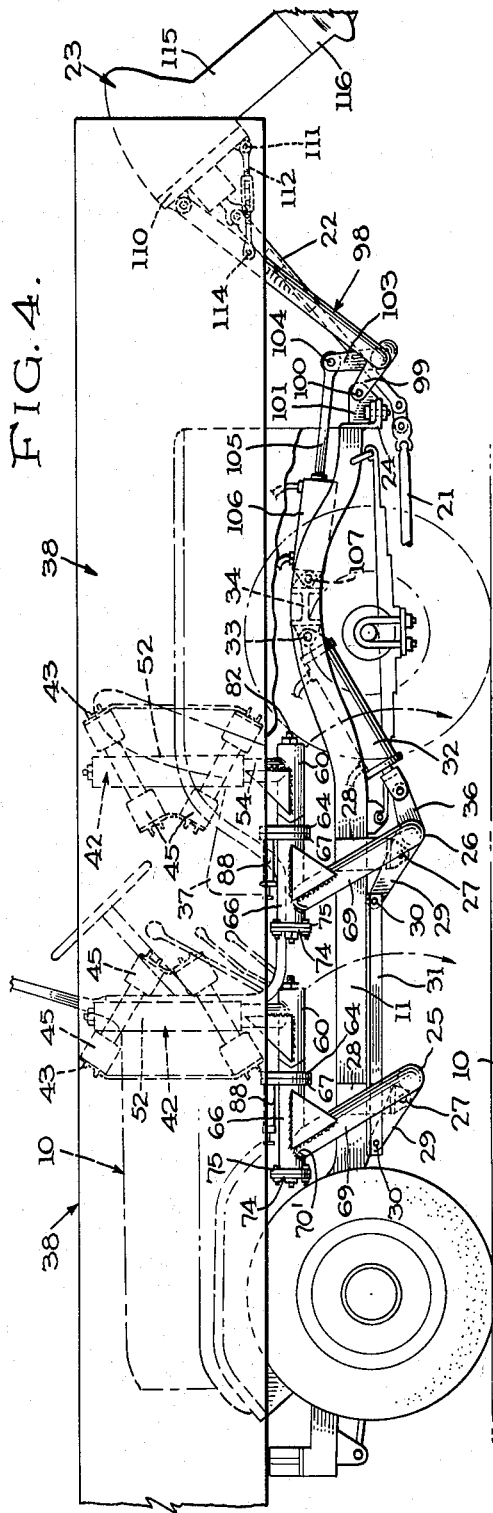
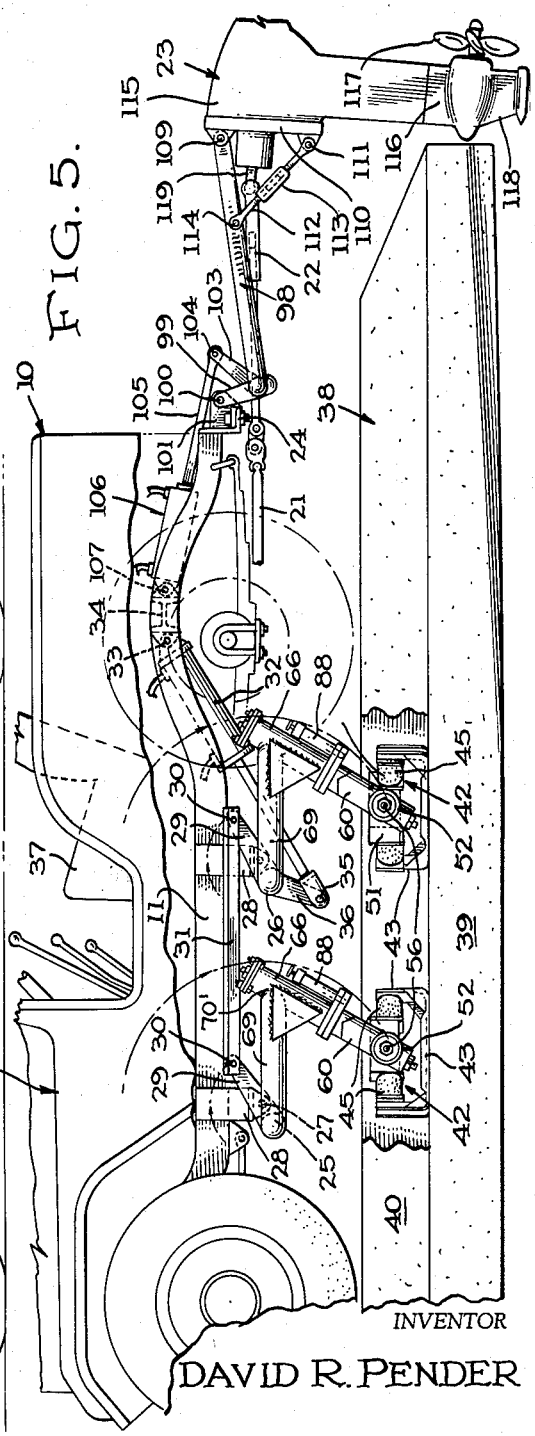
INVENTOR
DAVID R. PENDER
BY
B. P. Fishburn, Jr.
ATTORNEY Oct. 20, 1964  D. R. PENDER  3,153,396
AMPHIBIAN VEHICLE
Filed Dec. 11, 1962  5 Sheets-Sheet 5
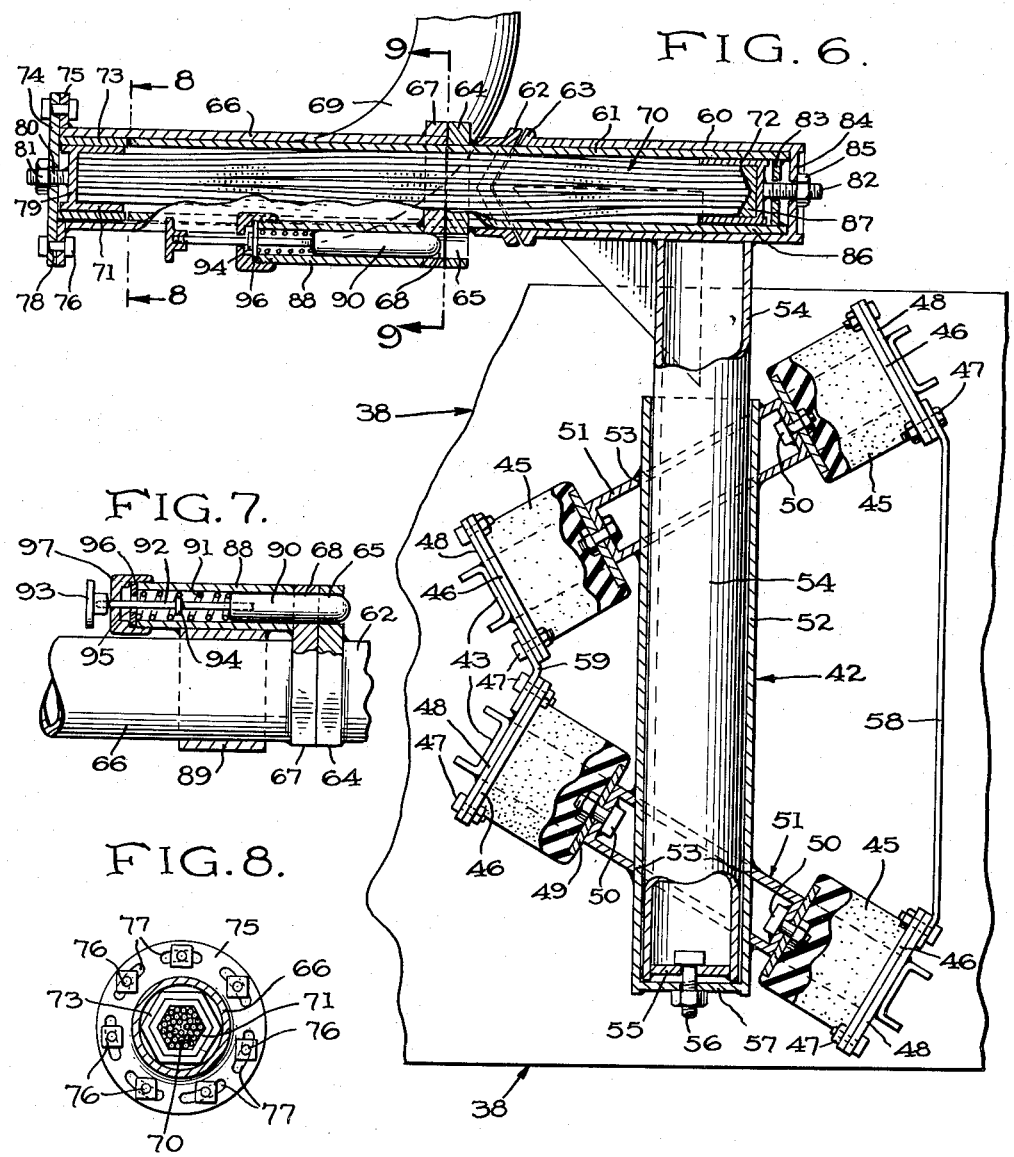
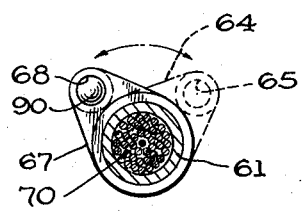
INVENTOR
DAVID R. PENDER.
BY
ATTORNEY 3,153,396
AMPHIBIAN VEHICLE
David R. Pender, 1018 Marion St., Columbia, S.C.
Filed Dec. 11, 1962, Ser. No. 243,760
7 Claims. (Cl. 115—1)

This invention relates to amphibian vehicles.

The present invention constitutes an improvement of the construction disclosed in my prior United States Patent 3,026,841, issued March 27, 1962, for Amphibian Vehicle.

The objects of the present invention are in general the same as those enumerated in my above-mentioned prior patent.

Additionally, it has as an important object of this invention to provide improved means for resiliently suspending the pontoons of the vehicle, as well as improved means for raising and lowering the pontoons relative to the land vehicle which carries the pontoons.

More specifically, it is an object of this invention to provide a less awkward and more efficient means for elevating the pontoons to their uppermost positions upon the land vehicle, substantially without physical effort, for transporting the pontoons over land.

Another important object of the present invention is to simplify the pontoon construction and to mount the pontoon suspension means on top of the structural portion of each pontoon, without the necessity for making the pontoons hollow and for sealing the pontoon suspension means therein.

Another object of the invention is to increase the ground clearance for the pontoon carrying and operating mechanism.

Still another object is to provide an improved and simplified lift means for the outdrive unit of the amphibian vehicle.

Additional objects and advantages of the invention will become apparent to those skilled in the art during the course of the following detailed description.

In the accompanying drawings, forming a part of this application, and in which like numerals are employed to designate like parts throughout the same, FIGURE 1 is a partly diagrammatic plan view of an amphibian vehicle according to the invention, parts omitted for simplification, and parts broken away, FIGURE 2 is a front end elevation of the vehicle illustrating the several adjusted positions of the pontoons according to the invention, FIGURE 3 is a side elevational view of the vehicle showing the pontoons in full lines in an intermediate position and in broken lines in the extreme raised and lowered positions, FIGURE 4 is a further side elevational view showing the pontoons and the outdrive unit in fully raised positions, together with the mechanism for raising and lowering the same, FIGURE 5 is a similar view showing the pontoons and outdrive unit in their fully lowered positions, FIGURE 6 is an enlarged fragmentary horizontal sectional view, partly in elevation, showing one pontoon suspension means and associated elements, FIGURE 7 is an enlarged fragmentary vertical section, partly in elevation, showing a pontoon locking means in the active or locking position, FIGURE 8 is a transverse vertical section taken on line 8—8 of FIGURE 6, FIGURE 9 is a similar section taken on line 9—9 of FIGURE 6, FIGURE 10 is a fragmentary perspective view of one pontoon suspension unit and associated parts, and FIGURE 11 is a perspective view of an outdrive lift yoke and associated elements.

In the drawings, wherein for the purpose of illustration is shown a preferred embodiment of the invention, the numeral 10 designates generally an automotive vehicle, such as the well-known four wheel drive "jeep." The vehicle 10 is substantially conventional and need not therefore be described in great detail. It includes a main or chassis frame 11 having front and rear axle housings 12 and 13, equipped with differential gear units 14 and 15 for transmitting power from the vehicle engine 16 to the four wheels of the vehicle 10. The usual change speed transmission 17 is provided between the engine and differential units 14 and 15, for powering the latter through suitable drive shafts 18 and 19. A power takeoff shaft 20 leading from the transmission 17 is coupled with a drive shaft 21, in turn connected at its rear end through a universal joint with a telescopic drive shaft 22 for an outdrive unit 23 to be further described. The vehicle 10 has the usual horizontal transverse draw-bar 24 at its rear end.

A pair of sturdy spaced, parallel, horizontal, transverse rock shafts 25 and 26 are arranged close to the bottom of the main frame 11 and near the longitudinal center thereof, and these rock shafts are pivoted at 27 upon the bottoms of depending brackets 28, secured rigidly to main frame 11 as shown in the drawings. The shafts 25 and 26 are bodily swingable about the aligned axes of each companion pair of pivot elements 27.

Each of the shafts 25 and 26 has a pair of radial arms 29 rigid therewith, pivotally mounted intermediate their ends upon the fixed pivot elements 27, and the arms 29 thus serve to suspend the shafts 25 and 26 bodily from the pivot elements 27. The free ends of the arms 29 are also pivotally connected at 30 to links or tie bars 31 which interconnect the shafts 25 and 26 so that they will turn in unison upon their respective suspension pivots 27.

An extensible and retractable fluid pressure operated cylinder-piston unit 32 has its rear end pivotally connected at 33 to a rigid transverse main frame brace 34. The unit 32 is substantially inclined as clearly shown in FIGURES 4 and 5. Its forward or piston rod end is pivotally secured at 35 to a radial crank arm 36, rigid with the transverse shaft 26, near and inwardly of one side of the main frame 11. As should now be obvious, extension and retraction of the cylinder-piston unit 32 causes simultaneous swinging of the shafts 25 and 26 upon the axes of pivot elements 27. The unit 32 is controlled directly by the vehicle operator in the driver's seat 37 by conventional control valve means, not shown.

Pontoons 38 are arranged upon opposite sides of the vehicle 10 and may include lower sections 39 formed of structurally rigid flotation material and upper sections 40, also formed of flotation material, which need not have high strength characteristics. The bottoms of the pontoons 38 may be provided with suitable high speed water planing surfaces. At their forward ends, the pontoons 38 may further include relatively deep portions 41 of flotation material to provide increased buoyancy at the forward end of the amphibian vehicle. The main body portions of the pontoons 38 are relatively shallow, to impart the minimum overhall width to the amphibian, when the pontoons are in their fully elevated positions, so as to comply with highway regulations.

The pontoons 38 are bodily mounted to the vehicle 10 and carrier shafts 25 and 26 by suspension units 42. One such suspension unit 42 is shown in detail in FIGURES 6 through 10 of the drawings. Since the four suspension units 42 for the pontoons, FIGURE 1, are all alike in construction, a detailed description of one unit will serve to describe all of them.

Each suspension unit 42 comprises a pair of rigid substantially U-shaped mounting brackets or yokes 43, rigidly secured directly at 44, FIGURE 10, to the top face of the lower structural portion 39 of the adjacent pontoon. The pair of brackets 43 of each unit 42 are disposed in converging relation longitudinally of the pontoon, toward the longitudinal center thereof, FIGURES 1 and 6. The upper non-structural flotation portion 40 of each pontoon may be recessed or cut away suitably to receive each suspension unit 42, and the latter rests firmly upon the lower structural portion of the pontoon, as stated.

Each unit 42 further comprises pairs of rubber or rubber-like shock absorbing suspension elements or heads 45, which may be cylindrical, as shown, or formed in other desired shapes, if preferred. The outer ends of the shock absorbing elements 45 are firmly anchored to plates 46 which in turn are rigidly secured at 47 to companion plates 48, welded or otherwise rigidly secured to the tops of brackets 43, as shown. The inner ends of the elements 45 carry attachment plates 49, firmly anchored thereto, and these plates are rigidly secured at 50 to box-like connector heads 51 which span the space between each pair of elements 45 of the unit 42.

Each unit 42 further comprises a sturdy bearing sleeve 52 arranged horizontally and transversely of the underlying pontoon 38, and rigidly mounted by welding or the like within aligned openings 53 of the heads 51 and rigidly interconnecting the latter. As shown clearly in FIGURE 1, the bearing sleeves 52 of the pair of units 42 for each pontoon are parallel and extend transversely of the pontoon and are at equal elevations and above the structural portion 39 of the pontoon. Journaled within each bearing sleeve 52 for rotation relative thereto is a crank pin or shaft 54 of tubular construction and having an end wall 55 loosely connected by a bolt 56 with an end wall 57 of bearing sleeve 52. The bolt 56 prevents relative axial movement of the parts 52 and 54 but allows relatvie rotation during the raising and lowering of the pontoons by the shafts 25 and 26. A connecting brace 58 is preferably provided between the divergent ends of the brackets 43 and rigidly secured to the adjacent plates 48 as shown in FIGURE 6. The converging ends of the brackets 43 are similarly connected in each unit 42 by a short V-shaped brace 59.

Due to the construction of the suspension units 42, as thus far described, vertical shock loadings on the pontoons 38 are absorbed by the resilient heads 45 through shearing stress on these heads. Lateral and longitudinal shock loadings on the pontoons are transmitted to the shock absorbing heads 45 largely in the form of compressive stress. This allows the pontoons 38 to shift vertically relative to the rigid carrying structure a substantially greater amount than the pontoons can shift longitudinally or laterally, as is desirable. That is to say, the resilient heads 45 are more yielding under the influence of shear stresses in the vertical direction than under the influence of compressive stresses exerted longitudinally or laterally upon the pontoons.

The yieldability of the suspension units 42 may be further varied by changing the relative hardness of the rubber or rubber-like material employed for the heads 45. This particular variation in design will be determined in accordance with the operating requirements, loadings and the environment in which the amphibian vehicle is to be operated.

Each suspension unit 42 further comprises at the inner end of the crank pin 54, and at right angles thereto, a sleeve 60 of relatively short length, which is welded or otherwise rigidly secured to the crank pin 54. The sleeve 60 engages telescopically over a relatively long tube 61, which extends considerably beyond the end of the sleeve 60 and has a coupling collar 62 rigidly secured thereto, as by welding. The sleeve 60 has a mating interfitting coupling end 63 which coacts with the collar 62 to impart rotation to the tube 61 when the sleeve 60 is turned with the crank pin 54 upon the longitudinal axis of the tube 61. A locking flange 64 having a locking opening 65 is also rigidly secured to the tube 61, near the collar 62, to turn with the tube 61.

The tube 61 extends telescopically inside of another sleeve 66 having the same diameter as the sleeve 60, and provided at one end with a locking flange 67, rigid therewith. The flange 67 has a locking opening 68, adapted under certain conditions to register with the opening 65. The sleeve 66 is rigidly secured to or integral with an end relatively short transverse extension 69, carried by the adjacent end of the shaft 25 or 26. As shown in FIGURE 1, each of the shafts 25 and 26 is provided at each end with one of the transverse extensions 69 or elbows. These extensions 69 are joined to the sleeves 66 at 70', as most clearly shown in FIGURES 4 and 5.

The sleeves 66 of the suspension units 42 are thus bodily carried by extensions 69 of shafts 25 and 26. The sleeves 66 therefore carry all of the other elements which make up the pontoon suspension units 42.

Within each tube 61 is a torsion spring 70, comprising a multiplicity of resilient wire elements arranged in a bundle with their end portions socketed within preferably hexagonal cups 71 and 72, FIGURE 6. The hexagonal cup 71 is received within a surrounding hexagonal socket member 73 which engages within the sleeve 66, outwardly of the adjacent end of tube 61, FIGURE 6. The element 73 has an integral cover plate 74 rigid therewith, bolted to an annular flange 75 on the adjacent end of sleeve 66, by preferably seven circumferentially equidistantly spaced bolts 76, which engage through a corresponding number of adjusting slots 77, FIGURE 8, in the flange 75, and through openings 78 in the plate 74 adapted to register with the slots 77. The arrangement of the seven bolt means 76, in conjunction with the hexagonal socket means for the ends of the torsion springs 70 allows for the maximum possible circumferential adjustment of the springs 70, as should be obvious. The provision of the slots 77 renders it further possible to adjust the springs infinitely. For example, the socket element 71 may be turned one step or sixty degrees within the outer member 73, while the latter may be adjusted reversely by a distance between a pair of the bolts 76. This results in an eight and one-half degree interval of adjustment for the torsion spring. By utilizing the slots 77, an even finer adjustment can be otbained as stated.

The hexagonal cup 71 has a flat end wall 79, carrying a central screw-threaded stud 80, engageable through a clearance opening in the plate 74 and provided outwardly of this plate with a nut 81. This connection between the socket cup 71 of the spring and the end plate 74 prevents the spring from retracting or shortenng axially during the twisting thereof. The opposite end of the multiple wire spring is firmly socketed within the cup 72, as stated, and this cup carries a screw-threaded stud 82, extending through openings in end plate 83 and 84 of tube 61 and sleeve 60 respectively. A nut 85 is carried by stud 82 outwardly of end plate 84. Suitable shim washers, not shown, are interposed between end plate 83 and the end wall of cup 72. There is also a slight space between the end of tube 61 and end plate 84. Nut 85 is tightened to provide the proper engaging pressure between coupling elements 62 and 63 and to provide proper tension upon the spring 70. The adjacent end portion 86 of tube 61 is hexagonally formed in cross section to socket the hexagonal cup 72 and prevent the latter from turning within the tube 61 when such tube is turned. The remainder of the tube 61, like the sleeves 60 and 66 is cylindrical. The interfitting coupling heads 62 and 63 cause the tube 61 to turn with the sleeve 60, when this sleeve is turned by the lifting or lowering of the adjacent pontoon with the crank pin 54 as will be further described.

The cup 72 has a conically recessed seat element 87 therein, in engagement with the ends of the individual wires making up the spring 70. This arrangement causes the wires near the outer surface of the bundle of wires to be slightly bowed or slackened when the spring 70 is in a relaxed condition, and such condition is illustrated in FIGURE 6. Progressing toward the center or core of the multiple wire spring 70, the individual wires have gradually less slack or bowing therein, due to the recessed seat 87. At the center of the spring the wire or wires are straight and unbowed. The reason for this construction of the spring is that the latter must undergo a twist or deflection of about 180 degrees during operation. If all of the individual wires of the spring were of the same length, the outermost wires or layers of wires would become stretched during the wrapping thereof around the core of the spring and the resilient action of the spring would be choked prematurely. By virtue of the arrangement disclosed in FIGURE 6, the spring 70 may have a full 180 degree torsional deflection without unduly tensioning any of the wires thereof and each individual wire of the bundle will additively resist the torsional deflection and produce a highly desirable spring rate and operating characteristic. This would not be possible in the limited space provided for the spring with any other known type of torsion bar, torsion leaf spring or the like. Therefore the spring 70 constitutes a very important feature of the invention as will further be apparent.

In actual practice with the pontoon 38 in FIGURE 6 located in the intermediate position of the three positions shown in FIGURE 2 for the pontoon, the spring 70 will be tensioned or twisted the maximum amount for storing up energy to elevate the pontoon to the uppermost position. However, for clarity of illustration of the spring construction, the spring has been shown out of phase 180 degrees in FIGURE 6 or in the untensioned condition which it would actually assume when the pontoon 38 is fully elevated to the full line position at the right-hand side of FIGURE 2. It is deemed unnecessary for a proper understanding of the invention to illustrate the spring 70 in the drawings in the twisted or deflected condition but it should be borne in mind in connection with FIGURE 6 that the spring 70 is actually in such twisted or deflected condition.

The locking plate 67 of sleeve 66 has a tubular housing 88 rigidly secured to one side theeerof by welding or the like and extending parallel to the sleeve 66 and further anchored to the sleeve by a strap 89 or the like secured to the tubular housing. Within the housing 88, a locking plunger pin 90 is mounted for reciprocation and adapted to engage through the openings 65 and 68 when the latter are in registration, under influence of a compressible coil spring 91 behind the plunger pin within the housing 88. The plunger pin 90 has an operating rod 92 connected therewith, having an operating handle 93 beyond one end of the housing. The rod 92 has an enlargement 94 thereon engageable through an elongated detent opening 95 in a washer 96, clamped by a screw threaded cap 97 against one end of tubular housing 88. The plunger pin 90, FIGURE 6, may be retained in a retracted position outside of the opening 65 by pulling upon the handle 93 against the force of the spring 91, and passing the enlargement 94 through the detent opening 95, and then turning the handle 93 to lock the enlargement 94 against the rear of the washer 96 as depicted in FIGURE 6. The spring 91 serves normally to maintain the plunger pin 90 in the locking position within the opening 65 and 68 as shown in FIGURE 7. When the parts are thus locked, no relative rotation between the tube 61 and the sleeve 66 is possible, and therefore the spring 70 cannot be twisted or untwisted.

With reference to FIGURES 1, 4, and 5, particularly, the invention amphibian vehicle includes means to support and raise and lower the previously mentioned outdrive unit 23 at the rear of the vehicle. Such means comprises a sturdy lift and support yoke 98 of the configuration shown in the drawings, including hinge knuckles 99, rigid therewith, and pivoted by pins 100 to knuckle brackets 101, rigidly secured to the drawbar 24. The forward cross bar 102 of yoke 98 also has crank arms 103 rigidly secured thereto and pivoted at their top ends, as at 104, to a piston rod 105 of a fluid pressure operated extensible and retractable cylinder piston unit 106, having its forward end pivoted at 107 to the main frame brace 34. The cylinder piston unit 106 is controlled by suitable valve means, not shown, adjacent the operator's seat 37 for raising and lowering the yoke 98 about the axis of the pins 100.

At the rear end, the spaced parallel arm extensions 108 of yoke 98 are pivoted at 109 to the top and opposite sides of a mounting plate 110 for the outdrive unit 23. The lower end and sides of the mounting plate 110 are likewise pivoted at 111 to adjustable links 112, having adjustable turnbuckles 113 connected therein. The tops of the links 112 in turn are pivoted at 114 to the sides of the yoke 98, as shown. In this manner the mounting plate 110 is stabilized in its connections with the yoke 98 in all adjusted positions of the latter.

The outdrive unit 23 is conventional and is detachably rigidly secured to the mounting plate 110 in a conventional manner, not shown in detail in the drawings. The outdrive unit may be of the type manufactured by Seapower Division, Sweinhart Equipment Sales, Inc., 2900 East Olympic Boulevard, Los Angeles 23, California, designated Seapower Model No. 230, and is well known to those skilled in the art. Briefly, it comprises an upper housing or gear case 115 and a lower housing section or gear case 116 which is rotatable upon the upper housing 15 by conventionable control means operable from the seat 37 and not shown herein. Steering of the amphibian vehicle is thus obtained when the vehicle is in the water by the turning of the lower portion 116 of the unit 23 relative to the upper portion 115, under direct control of the operator. The propeller 117 and rudder means 118 is on the turnable and reversible lower portion 116 of the outdrive unit. The upper housing or portion 115 is rigid with the mounting plate 110 and is not turned to produce steering. The input drive shaft for the unit 23, not shown, is coupled through the mounting plate 110 with an input shaft 119, connected through a suitable universal joint with the drive shaft 22.

The above completes the description of the structure embodying the present invention.

The operation of raising and lowering the outdrive unit 23 is independent of the operation of raising and lowering the pontoons 38, and the raising and lowering of the outdrive unit and the yoke 98 carrying it is under the independent control of the operator through the cylinder piston unit 106 as previously mentioned. FIGURE 4 of the drawings shows the cylinder piston unit 106 retracted for holding the outdrive unit 23 and the yoke 98 in the fully elevated position as when the amphibian is traveling overland. FIGURE 5 shows the outdrive unit 23 fully lowered as when the amphibian is on the water. The propeller of the outdrive unit 23 is powered from the import shaft 119 and through gearing within the unit 23 which is not shown herein. Shaft 119 in turn is powered by the drive shaft sections 21 and 22 from the power take off shaft 20. While in the water, the amphibian may readily be steered in any direction and may be operated forwardly or in reverse by the turning of the lower portion 116 of the unit 23 as previously described. Through the change speed transmission 17 of the vehicle 10, the amphibian may be driven at different speeds in the water.

The operation of the pontoons 38 between their uppermost and fully lowered positions is as follows. As depicted in FIGURES 2 and 3, the pontoons 38 have essentially three main adjusted positions, namely, the fully lowered and intermediate positions shown in broken lines at the right-hand side of FIGURE 2 and the fully elevated position shown in full lines at the right-hand side of this figure. The movement of the pontoons 38 to and from the fully lowered and intermediate positions is accomplished through the turning of the shafts 25 and 26 in unison upon their pivots 27 under influence of the cylinder piston unit 32.

With reference to FIGURE 5, the pontoons 38 are fully lowered and the cylinder piston 32 is fully extended and the extensions 69 of the shafts 25 and 26 are approximately horizontal. The pontoon suspension units 42 are now locked by the plunger pins 90, and the sleeves 60 and 66 which house the springs 70 and associated elements are inclined and parallel and depending from the extensions 69 as shown in FIGURE 5.

In order to elevate the pontoons 38 to the intermediate position shown in full lines in FIGURE 3, the cylinder piston unit 32 is retracted in the manner shown in FIGURE 4 and this causes the shafts 25 and 26 to turn upon their pivots 27 and the arms or extensions 69 swing to the inclined positions shown in FIGURE 4 by turning in the counter-clockwise direction from their initial positions in FIGURE 5. The locking plunger pins 90 of the suspension units 42 remain active and the sleeves 60 and 66 and associated parts are now horizontally disposed, FIGURE 4, at the tops of the inclined extensions 69. At all times, the links 31 cause the shafts 25 and 26 and associated elements to turn in unison.

In order to shift the pontoons 38 to the uppermost position shown in full lines in FIGURE 4 and in full lines at the right-hand side of FIGURE 2, the cylinder piston unit 32 remains retracted as shown in FIGURE 4 and does not funciton or take any part in the final elevation of the pontoons.

The pontoon suspension units 42 are now arranged as shown in FIGURE 3 and in FIGURE 6 and also in FIGURE 4 with the sleeves 60 and 66 and associated elements aligned axially and in the same horizontal plane so that they are capable of forming hinges for the final upward swinging movement of the pontoons. Whenever the sleeves 60 and 66 of the adjacent units 42, are out of axial alignment, as in FIGURE 5, they cannot serve as hinges for the swinging of the pontoons about the axis thereof as should be obvious. With the sleeves 60 and 66 of the units 42 axially aligned, the plunger pins 90 are retracted and unlocked as indicated in FIGURE 6 by manipulating the handles 93. The torsion springs 70 are now fully deflected with stored energy as previously explained in connection with FIGURE 6, and as soon as the plunger pins 90 are unlocked, these springs tend to urge or bias the pontoons 38 upwardly about the aligned axis of the sleeves 60 and 66, so that very little physical effort is required to shift or swing the pontoons 38 to their uppermost positions. This final upward swinging of the pontoons about the axis of the sleeves 60 and 66 of the units 42 is accomplished by exerting a slight lifting force on the pontoons, to swing them with the crank pins 54 upwardly from the intermediate pontoon position to the uppermost position thereof. When this slight lifting force is exerted upon the pontoons, the crank pins 54 swing upwardly, turning the sleeve 60, and the latter through the coupling heads 62 and 63 and under the influence of the torsion spring 70 turns the tube 61 inside of the sleeve 66 which is rigid with the extension 69 of shaft 25 or 26.

When the pontoons 38 reach the fully elevated positions shown in the drawings, they are arranged on their sides with their narrower dimension or height projecting outwardly from the sides of the wheeled vehicle 10 to provide the minimum possible overall width for the amphibian while traveling overland on a highway or the like. While in the fully elevated positions, the enlarged forward end portions of the pontoons project or wrap around the front end of the vehicle 10 without interference therewith. At this time, fully elevated pontoons constitute doorlike closures for the normally open sides of the operator's compartment. Incidentally, when the pontoons are in the intermediate positions shown in FIGURE 3 for example, they may constitute walkways or running boards for the vehicle.

When the pontoons 38 are fully elevated, they need not be locked, since the resistance of the springs 70 will prevent them from swinging downwardly to the intermediate positions.

It is a very simple matter to swing the fully elevated pontoons 38 back down to their intermediate positions by merely exerting a relatively slight downward pressure upon the same, and the resistance of the springs 70 builds up very gradually as the springs are twisted and store up energy during the downward swinging movement of the pontoons. When the pontoons reach the intermediate positions the coacting openings 68 and 65 will again be in registration and the handles 93 are turned to release the plunger pins 90 which again enter the openings 68 and 65 and securely lock the pontoons into intermediate position shown in full lines at the left-hand side of FIGURE 2 and also in full lines in FIGURE 3. When so locked and positioned, the pontoons may be lowered to their downmost positions shown in FIGURE 5 by causing extension of the cylinder piston unit 32 and again swinging the shafts 25 and 26 on their pivots 27 for causing the parts to return to the positions in FIGURE 5, first described in connection with the operation of the pontoons.

The outdrive unit 23 is readily detachable bodily from the mounting plate 10 whenever this is desired. In like manner, the pontoons 38 along with the sleeves 52, crank pins 54 and sleeves 60 may readily be detached bodily from the sleeves 66 and shafts 25 and 26 when this is desired.

The invention constitutes an attachment to the conventional vehicle 10 without great difficulty and without any major modification of the land vehicle structure. The major components of the invention, namely the pontoons and the outdrive unit are powered by the simple cylinder piston units 32 and 106. The final raising of the pontoons to their fully elevated positions is accomplished in a highly convenient and expeditious manner with an absolute minimum of physical effort and without awkwardness and with major assistance from the torsion springs 70.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. An amphibian vehicle comprising a motorized land vehicle, a water propulsion unit mounted upon the rear of said land vehicle, power operated means on the land vehicle connected with said water propulsion unit and carrying the same and operable to raise and lower the water propulsion unit, drive shaft means on the land vehicle connected with said water propulsion unit to power the same in the water, a pair of side pontoons for said amphibian vehicle, power operated carrier means for said pontoons on said land vehicle operable to position the pontoons in a water engaging position beneath said land vehicle and in an intermediate elevated position on said land vehicle above ground, and resilient suspension means for said pontoons interconnecting the latter and said power operated carrier means and including spaced suspension units anchored to the pontoons, each suspension unit having telescoping relatively rotatable tubular parts constituting a hinge between the suspension unit and said carrier means, torsion bar-type springs disposed bodily within said tubular parts and being twisted and storing energy to bias the pontoons upwardly when the latter are in said intermediate position, locking pin means parallel to the axis of twist of said springs to releasably lock said tubular parts against relative movement when said springs have stored energy, said springs biasing said pontoons upwardly to a fully elevated position on said land vehicle above said intermediate position with said pontoons rotated upon their sides and shifted inwardly laterally relative to their fully lowered and intermediate positions.

2. The invention as defined by claim 1, and wherein each resilient suspension unit further comprises a crank pin secured to one of said tubular parts and extending beyond one side thereof, a bearing sleeve surrounding said crank pin telescopically and rotatably, and angled converging resilient shock absorbing mounts for said bearing sleeve secured to said pontoon.

3. An amphibian device comprising a wheeled motor vehicle to operate overland, a marine propulsion unit on the rear of said vehicle to propel the amphibian device in water, power operated means connected with said marine propulsion unit to raise and lower the same, a pair of spaced transverse underslung shafts including end crank arms pivoted to said vehicle, linkage means interconnecting said shafts and causing them to turn in unison upon their pivots, power operated means connected with at least one of said shafts and operable to turn said shafts upon their pivots, first sleeve elements secured rigidly to said crank arms to turn therewith, tubes telescopically and rotatably engaging within the first sleeve elements and extending beyond corresponding ends thereof, second sleeve elements mounted telescopically upon said tubes and spaced axially of the first sleeve elements, interfitting coupling parts on the tubes and second sleeve elements causing the latter to turn the former when the second sleeve elements are rotated, torsion spring means within the tubes and socketed therein for twisting during rotation of the tubes relative to the first sleeve elements, releasable locking means on the first sleeve elements and tubes to lock the first sleeve elements and tubes against relative rotation when the spring means has maximum stored energy, transverse crank pins rigid with the second sleeve elements and extending beyond corresponding sides thereof, bearing sleeves receiving and supporting said crank pins rotatably, resilient shock absorbing mounts secured to and carrying the bearing sleeves and partly underlying the latter, and a pair of longitudinal side pontoons for the amphibian device underlying said shock absorbing mounts and secured thereto.

4. The invention as defined by claim 3, and wherein each torsion spring means has one end socketed within said tube and held against rotation relative thereto and has its opposite end socketed within said first sleeve element and held against rotation relative thereto.

5. The invention as defined by claim 3, and wherein each sock absorbent mount for each bearing sleeve comprises a pair of angled converging mount sections secured to said sleeve and having resilient parts which are subjected largely to shearing stress by vertical shocks on said pontoons and are subjected largely to compressive stress by lateral and longitudinal shocks on said pontoons.

6. The invention as defined by claim 5, and wherein said resilient parts are rubber-like members, and rigid connecting members between the rubber-like members, said sleeve and said pontoon.

7. An amphibian vehicle comprising a motorized wheeled vehicle body portion, a marine propulsion unit mounted on the rear of said wheeled vehicle body portion, a pair of pontoons arranged on opposite sides of said vehicle body portion, transverse rock shaft means carrying said pontoons and operable to raise and lower the same relative to the vehicle body portion, the rock shaft means operable to position the pontoons below the wheels of the vehicle body portion for supporting the amphibian on water and also to position the pontoons at an intermediate elevated position somewhat above the bottoms of the wheels of the vehicle body portion, said pontoons spaced bodily outwardly of the opposite sides of the vehicle body portion in both aforementioned adjusted positions thereof, means forming spring-loaded hinge connections between the pontoons and the rock shaft means and allowing the pontoons to be bodily swung upwardly to fully elevated positions above the wheels of the vehicle body portion and substantially inwardly with respect to the sides of the vehicle body portion while the pontoons remain attached to the rock shaft means, and releasable lock means for said spring-loaded hinge connections, said spring-loaded hinge connections biasing the pontoons upwardly toward their fully elevated positions so that they may be shifted to such positions with a minimum of effort and without disconnecting them from the rock shaft means, said spring-loaded hinge connections also aiding in maintaining the pontoons in their fully elevated positions and controlling their relowering to said intermediate elevated position.

References Cited in the file of this patent

UNITED STATES PATENTS

| | | |
|---|---|---|
| 2,986,402 | Winton | May 30, 1961 |
| 3,026,841 | Pender | Mar. 27, 1962 |
| 3,098,645 | Owens | July 23, 1963 |